(12) United States Patent
Kim

(10) Patent No.: US 8,079,576 B2
(45) Date of Patent: Dec. 20, 2011

(54) INSULATOR FOR BUSHING

(75) Inventor: Il Lang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 471 days.

(21) Appl. No.: 12/337,342

(22) Filed: Dec. 17, 2008

(65) Prior Publication Data

US 2009/0295051 A1 Dec. 3, 2009

(30) Foreign Application Priority Data

Jun. 2, 2008 (KR) .................. 10-2008-0051750

(51) Int. Cl.
*B60G 11/22* (2006.01)
*F16F 7/12* (2006.01)
*F16F 1/36* (2006.01)

(52) U.S. Cl. ......... 267/293; 267/141; 267/153; 248/606

(58) Field of Classification Search .................. 267/292, 267/293, 294, 141.1, 141, 153; 248/605, 248/606, 634, 635; 180/228; 296/35.1
See application file for complete search history.

(56) References Cited

U.S. PATENT DOCUMENTS

2006/0244188 A1* 11/2006 Johnson et al. ............... 267/293

FOREIGN PATENT DOCUMENTS

| KR | 1988-031515 U | 8/1998 |
|---|---|---|
| KR | 10-2005-0117019 A | 12/2005 |
| KR | 10-2007-0084923 A | 8/2007 |

* cited by examiner

*Primary Examiner* — Thomas J Williams
(74) *Attorney, Agent, or Firm* — Morgan, Lewis & Bockius LLP

(57) ABSTRACT

An insulator for a bushing may include a plurality of insulator bodies, a center hole formed to each insulator body for coupling the insulator bodies of the bushing to a bushing bracket, and operation slot being formed on each insulator body, wherein the insulator bodies are separately and relatively-rotatably coupled each other.

22 Claims, 17 Drawing Sheets

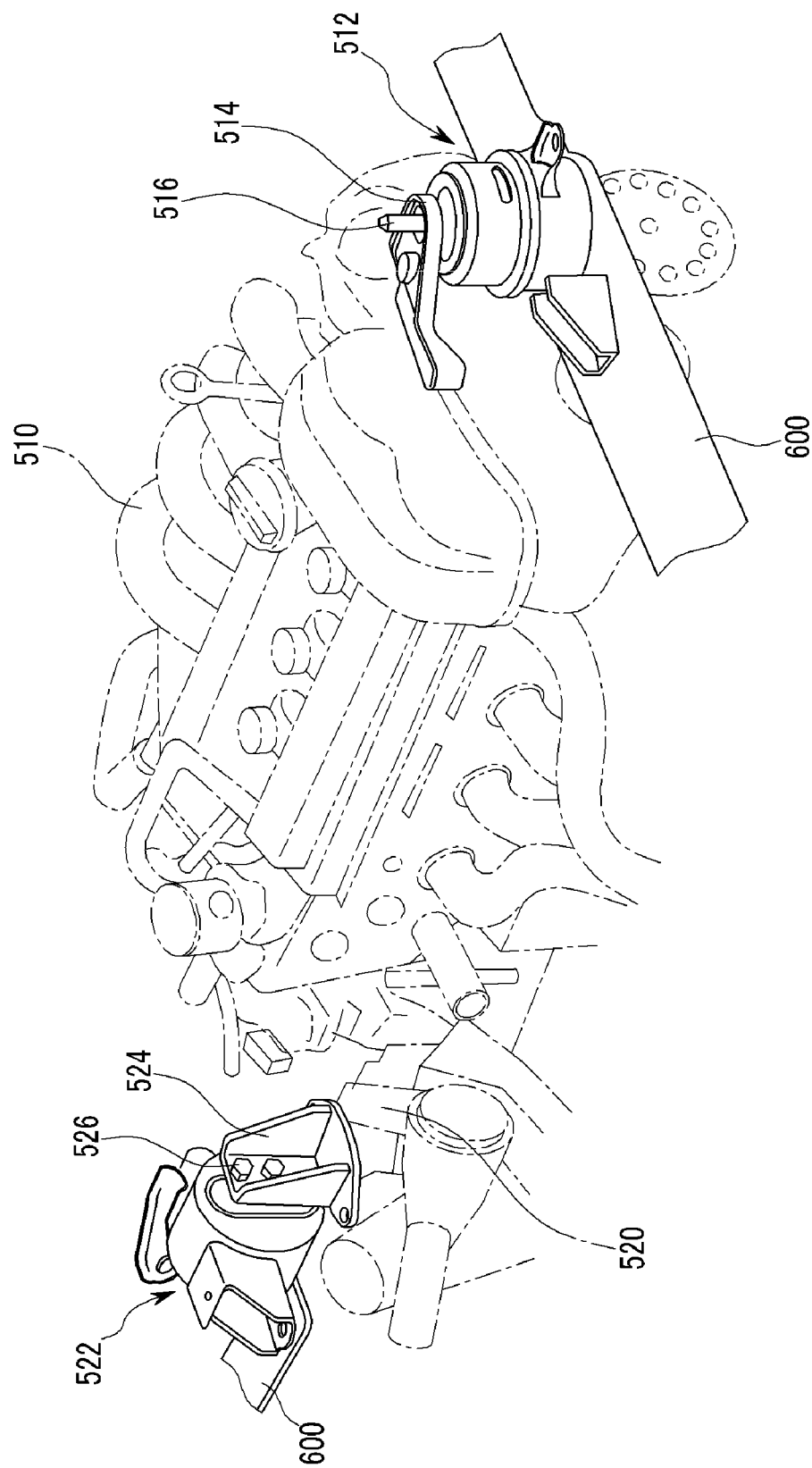

INSULATOR FOR BUSHING

CROSS-REFERENCE TO RELATED APPLICATION

The present application claims priority to Korean Patent Application No. 10-2008-0051750 filed on Jun. 2, 2008, the entire contents of which are incorporated herein for all purpose by this reference.

BACKGROUND OF THE INVENTION

1. Field of the Invention

The present invention relates to an insulator. More particularly, the present invention relates to an insulator for a trailing arm bushing, an engine mounting bushing, a transmission mounting busing and so on.

2. Description of Related Art

Basically, a suspension system refers to the use of front and rear springs to suspend a vehicle's frame and body, or unitized body, as well as the engine and power train above the wheels.

The suspension system is mainly divided into a rigid axle suspension and an independent suspension, and recently the independent suspension has been primarily used for a passenger car.

In the independent suspension system, a rear suspension system of a coupled torsion beam axle (CTBA) type has a simple structure, a low manufacturing cost, and a low weight, and the rear suspension system of the coupled torsion beam axle has reliable driving stability so it is broadly used for a small car or a small sedan.

The rear suspension system of coupled torsion beam axle type, as shown in FIG. 14, includes a torsion beam 101 that is disposed along a width direction of a vehicle, and a trailing arm 105 that is provided with a carrier 103 for mounting a tire and a wheel.

A bushing unit 109 and a shock absorber 107, which is connected with a frame of a vehicle, are disposed forward and rearward of the trailing arm 105, and a spring 113 is disposed to a spring seat 111.

The bushing unit 109 includes a bushing 121 and a bushing bracket 125.

The bushing 121 includes an outer pipe 115 that is connected to an end of the trailing arm 105, an inner pipe 117 that is disposed within the outer pipe 115, and an insulator 119 that is disposed between the outer pipe 115 and the inner pipe 117.

The bushing 121 is mounted to the bushing bracket 125, which is mounted to a subframe, by a bolt 123 that penetrates the inner pipe 117.

A center hole 126, in which the inner pipe 117 is mounted, is formed to the insulator 119, as shown in FIG. 14 and FIG. 15, and a pair of operation slots 127 is formed near the center hole 126.

The shape of each operation slot 127 is as a curved line symmetrically formed with respect to the center hole 126, wherein ends of the operation slots 127 are bent toward the circumference of the insulator 119.

However, the conventional insulator is subject to contact with a vehicle body when a vehicle is driving, and if the contact continues, a crack can be generated in the insulator, particularly in the end of the insulator.

Enlargement of the crack may induce deterioration of ride comfort, driving stability, durability, and so on.

Also, bushings for mounting other elements for a vehicle have similar problems.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an insulator for a bushing, which has a plurality of insulator bodies in order to enhance durability.

In an aspect of the present invention, an insulator for a bushing may include a plurality of insulator bodies, a center hole formed to each insulator body for coupling the insulator bodies of the bushing to a bushing bracket, and operation slot being formed on each insulator body, wherein the insulator bodies are separately and relatively-rotatably coupled each other.

When the number of operation slots is even number per one insulator body, the operation slots may be disposed symmetrically with respect to the center hole.

Each operation slot may be configured to be offset from the center hole with a predetermined distance in a radial direction thereof and operation slots of at least two insulator bodies are not disposed on the same position in the radial direction from the center hole so as to prevent extensions of cracks occurring at the insulator bodies.

A relative rotation angle between each operation slot may be substantially zero with respect to the center hole so that the bushing has one directionality of damping.

Distal end positions and center portion of the operation slot may be configured not to be disposed on a common axis.

In another aspect of the present invention, an insulator for a bushing having a plurality of insulator bodies may be featured that a center hole is formed to each insulator body for inserting a bolt for connecting the bushing and a bushing bracket, and a plurality of operation hole being symmetrically formed with respect to the center hole are formed to each insulator body.

The insulator may be a combination of first, second, and third insulator bodies, first, second, and third operation slots may be respectively formed to the first, second, and third insulator bodies, each operation slot per one insulator body may be symmetrically formed as a pair with respect to the center hole, and the shape of each operation slot is as a crescent and distal ends of the each operation slot are bent toward the circumference of the insulator.

A distance between the second operation slot and the center hole may be shorter than a distance between the first operation slot and the center hole, and distal ends of the second operation slot may be formed between distal ends of the first operation slot and an imaginary line perpendicularly penetrating the center hole.

The third operation slot may have the same shape as the first operation slot and is formed at the same position as the first operation slot.

The insulator may be a combination of first, second, and third insulator bodies, first, second, and third operation slots are respectively formed to the first, second, and third insulator bodies, the operation slots are symmetrically formed as pairs per one insulator body with respect to the center hole, and the shape of the operation slots is as a crescent and distal ends of the operation slots are bent toward the inside of the insulator.

A distance between the second operation slot and the center hole may be shorter than a distance between the first operation slot and the center hole, and distal ends of the second operation slot may be formed between distal ends of the first operation slot and an imaginary line perpendicularly penetrating the center hole.

The third operation slot may have the same shape as the first operation slot and is positioned at the same position as the first operation slot.

The insulator may be a combination of first and second insulator bodies, the plurality of operation slots are first and second operation slots that are respectively formed to the first and second insulator bodies, the operation slots are symmetrically formed as pairs per one insulator body with respect to the center hole, and the shape of the operation slots is as a crescent and ends of the operation slots are bent toward the circumference of the insulator.

A distance between the second operation slot and the center hole may be shorter than a distance between the first operation slot and the center hole, and distal ends of the second operation slot may be formed between distal ends of the first operation slot and an imaginary line perpendicularly penetrating the center hole.

The insulator may be a combination of first and second insulator bodies, first and second operation slots are respectively formed to the first and second insulator bodies, the operation slots are symmetrically formed as pairs per one insulator body with respect to the center hole, and the shape of the operation slots is as a crescent and ends of the operation slots are bent toward the inside of the insulator.

A distance between the second operation slot and the center hole may be shorter than a distance between the first operation slot and the center hole, and distal ends of the second operation slot may be formed between distal ends of the first operation slot and an imaginary line perpendicularly penetrating the center hole.

The insulator may be disposed in a trailing arm bushing, which is engaged with a bushing bracket of a sub-frame connected to an end of a coupled torsion beam axle type of suspension system.

The insulator may be disposed in an engine mounting bushing for mounting an engine.

The insulator may be disposed in a transmission mounting bushing for mounting a transmission.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 17 is a perspective view showing an engine and a transmission, which is provided with an insulator according to an exemplary embodiment of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
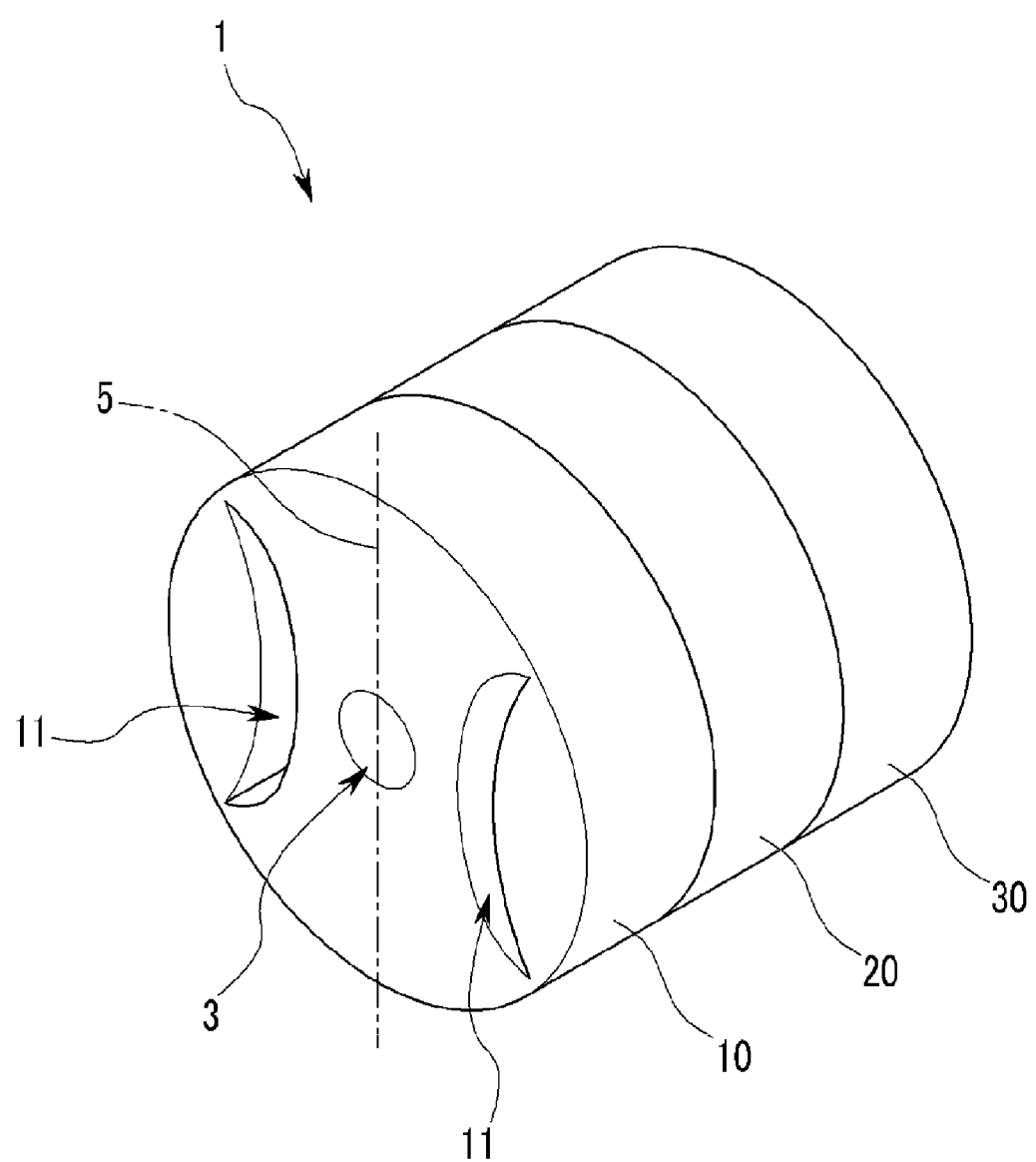
FIG. 1 is a perspective view of an insulator for a bushing according to a first exemplary embodiment of the present invention.
Figure 2:
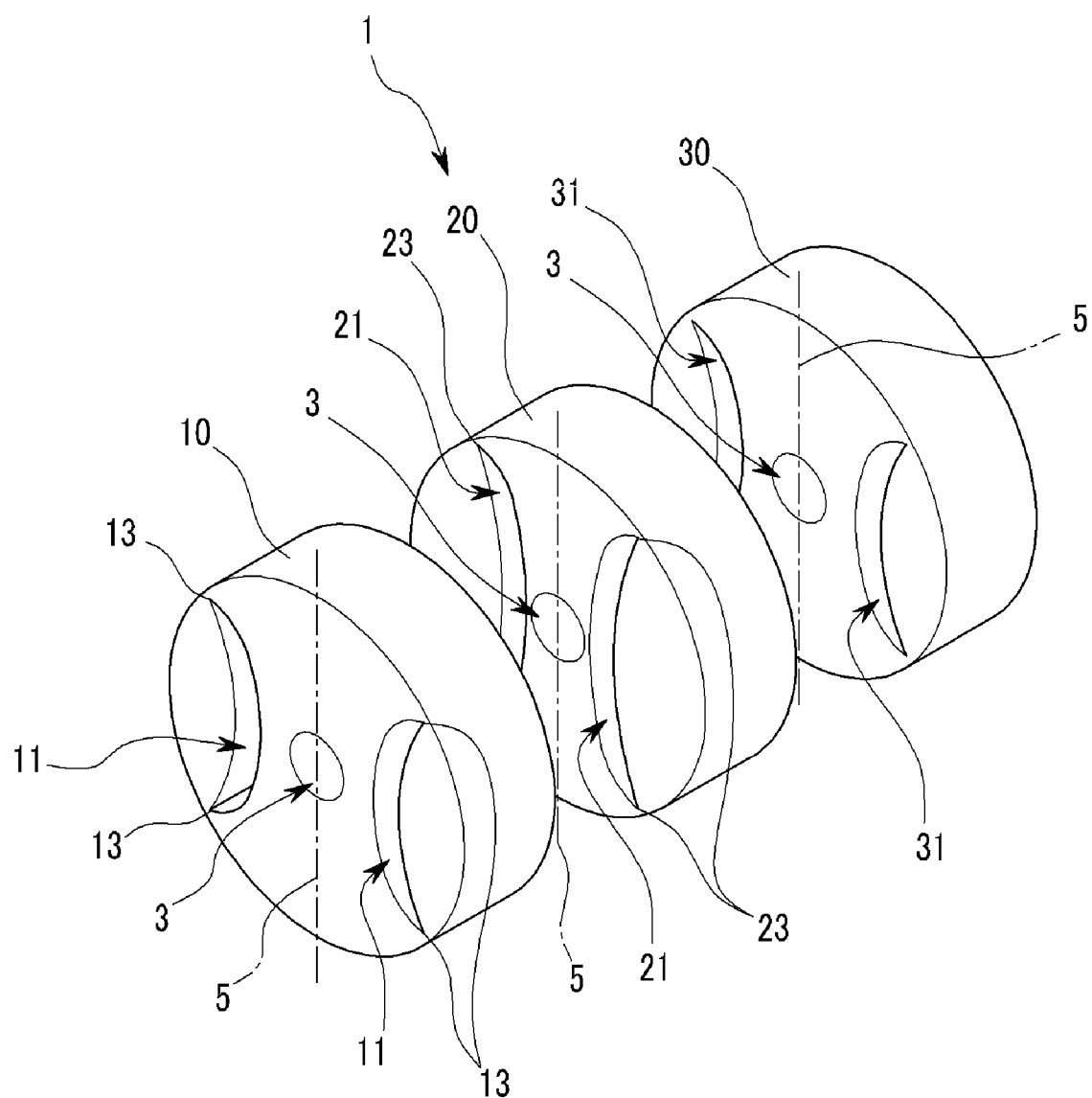
FIG. 2 is an exploded perspective view of an insulator for a bushing according to the first exemplary embodiment of the present invention.
Figure 3:
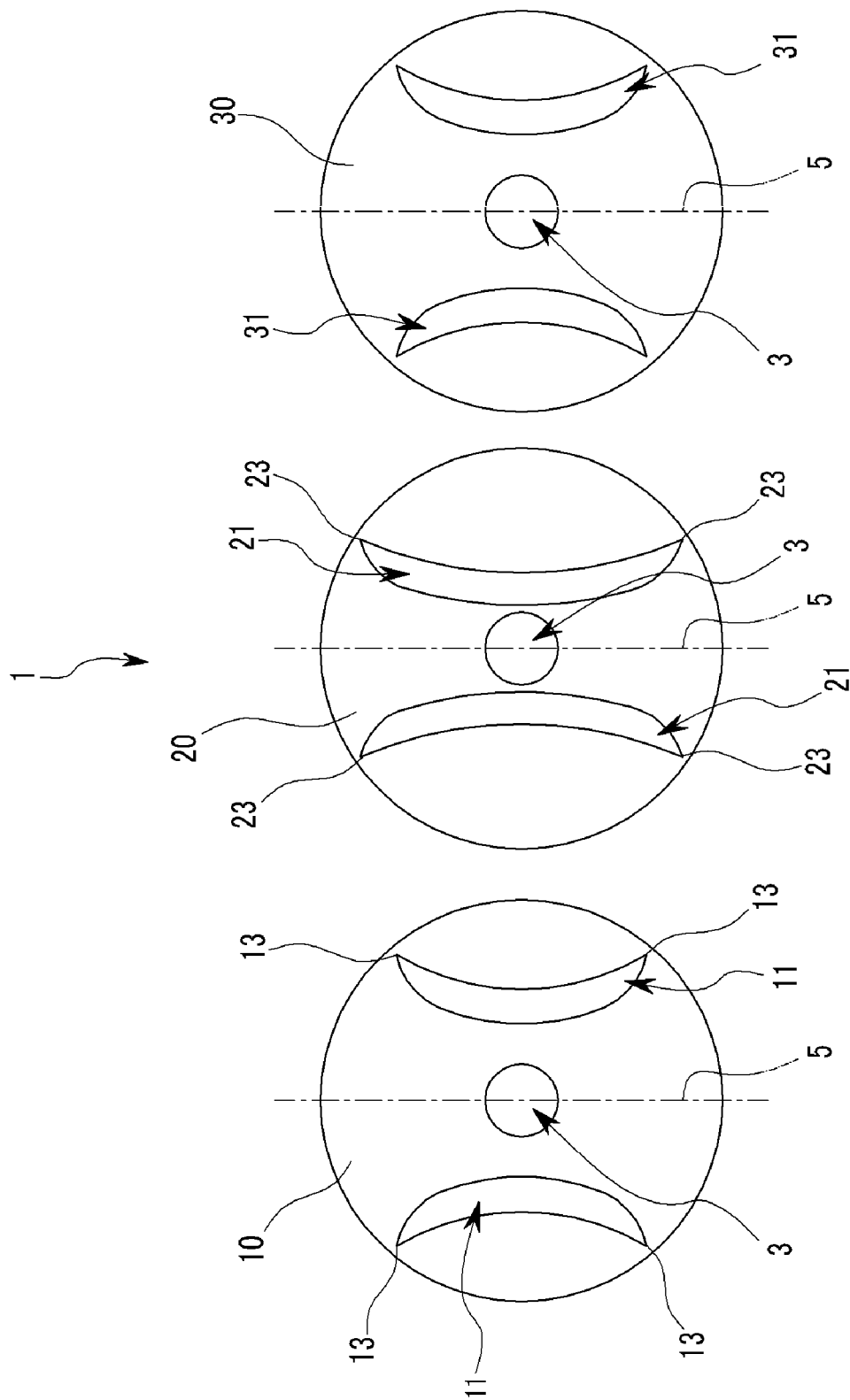
FIG. 3 is a front view of each insulator body of an insulator for a bushing according to the first exemplary embodiment of the present invention.
Figure 4:
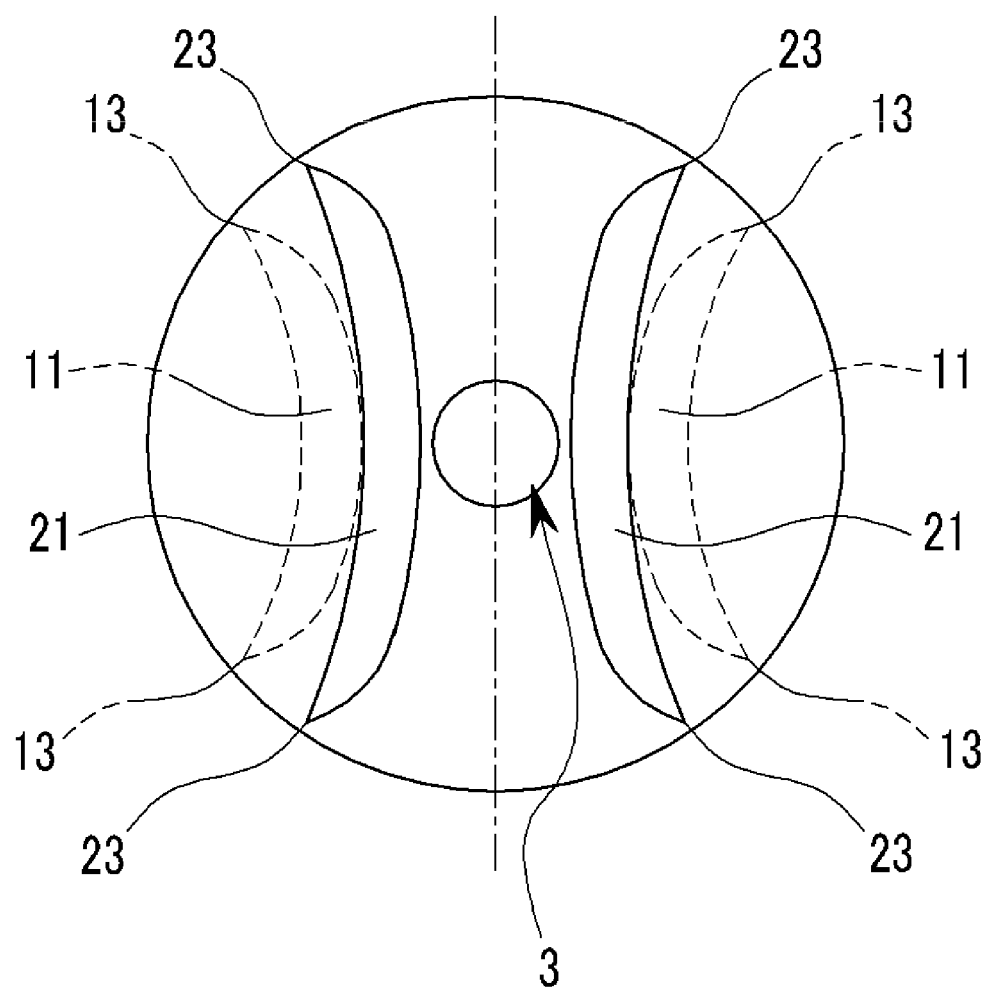
FIG. 4 is a drawing showing differences between insulator bodies of an insulator for a bushing according to the first exemplary embodiment of the present invention.

FIG. 1 and FIG. 2 are respectively a perspective view and an exploded perspective view of an insulator for a bushing according to various embodiments of the present invention. FIG. 3 and FIG. 4 are front views of each insulator body of an insulator for a bushing and a drawing showing differences between insulator bodies of an insulator for a bushing according to various embodiments of the present invention.

Before explaining an insulator for a bushing according to the various embodiments of the present invention, a rear suspension system of a coupled torsion beam axle, in which the insulator is used, will be explained referring to FIG. 14.

A suspension system of a coupled torsion beam axle, in which the insulator is used, has a similar scheme to that described above.

Figure 14:
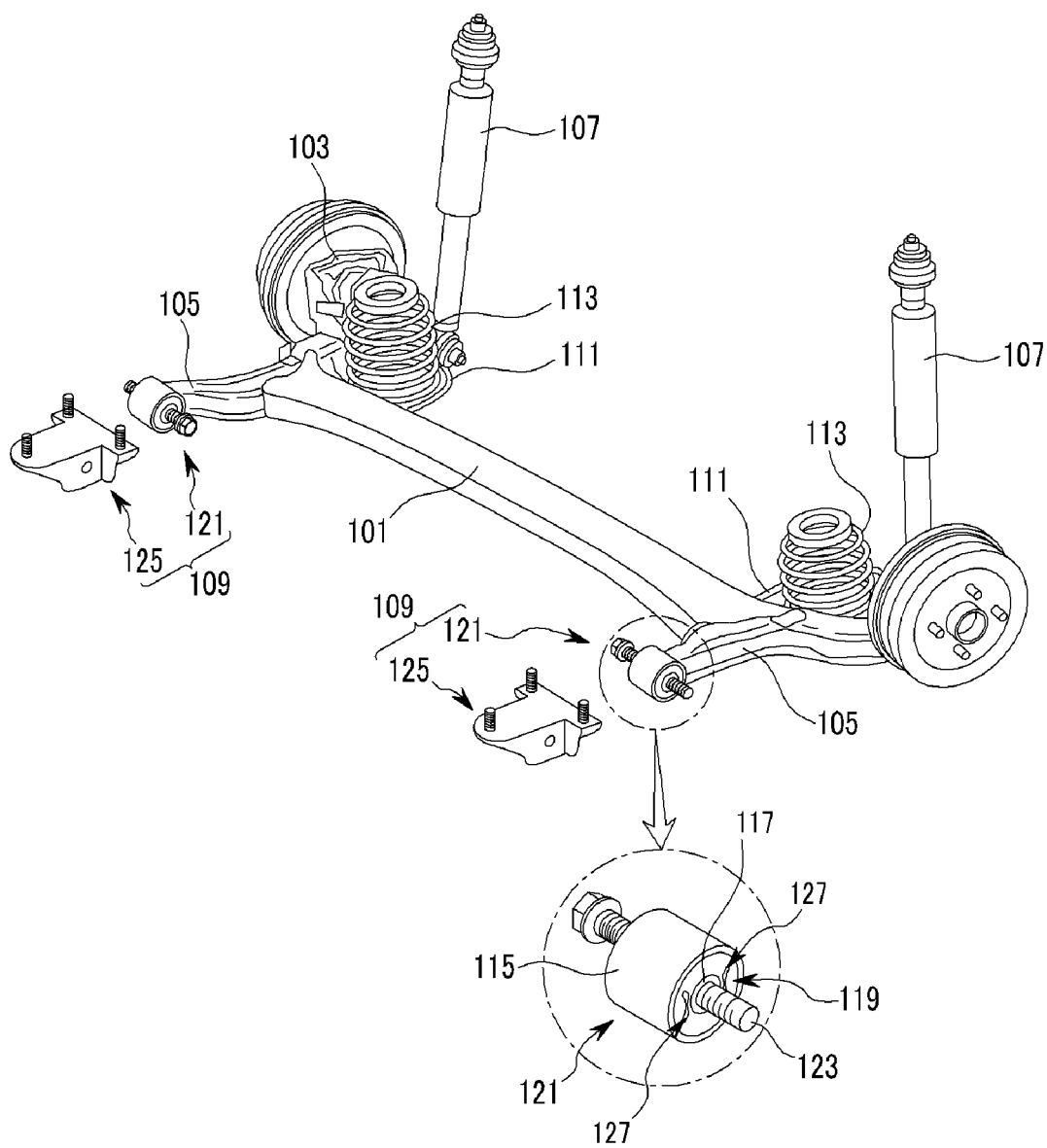
FIG. 14 is a perspective view of a general coupled torsion beam axle (CTBA).
Figure 15:
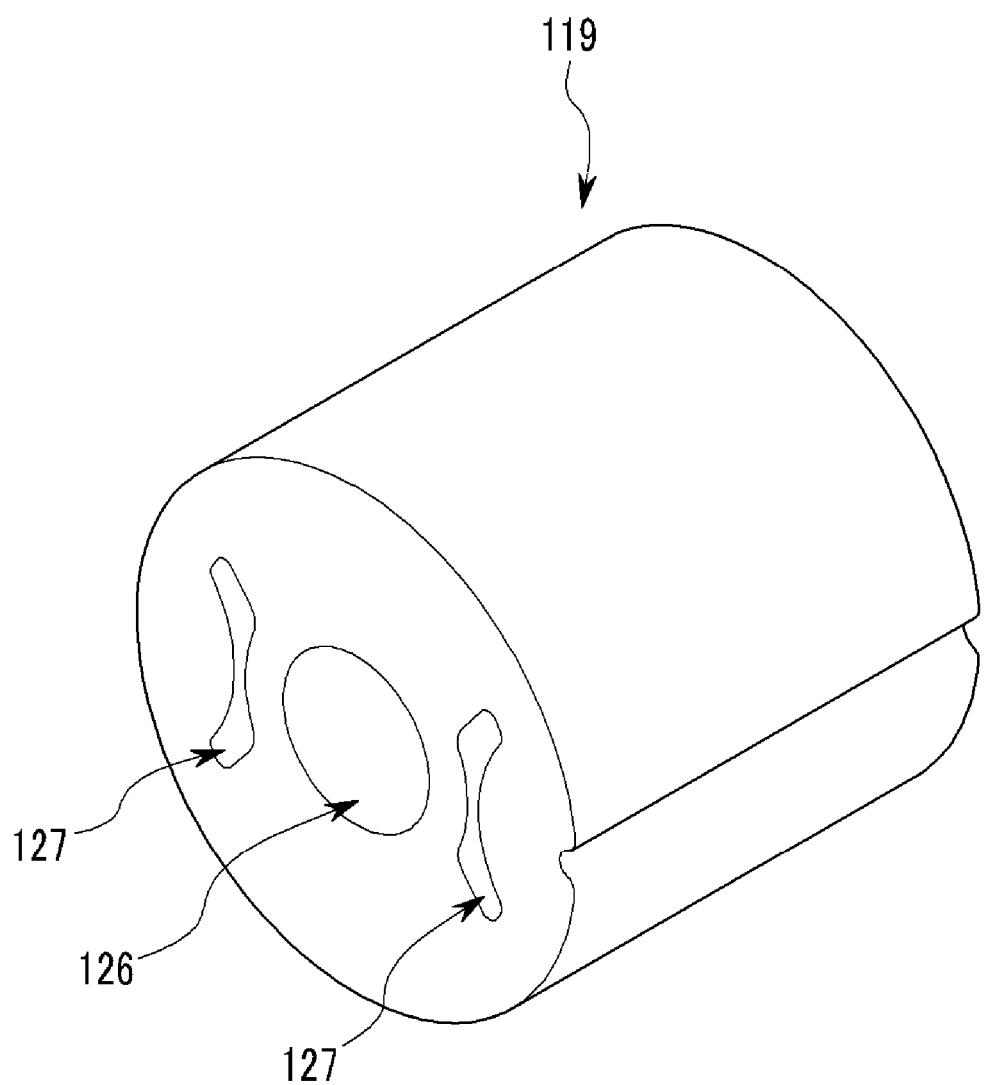
FIG. 15 is a perspective view of a general insulator for a bushing.
Figure 16:
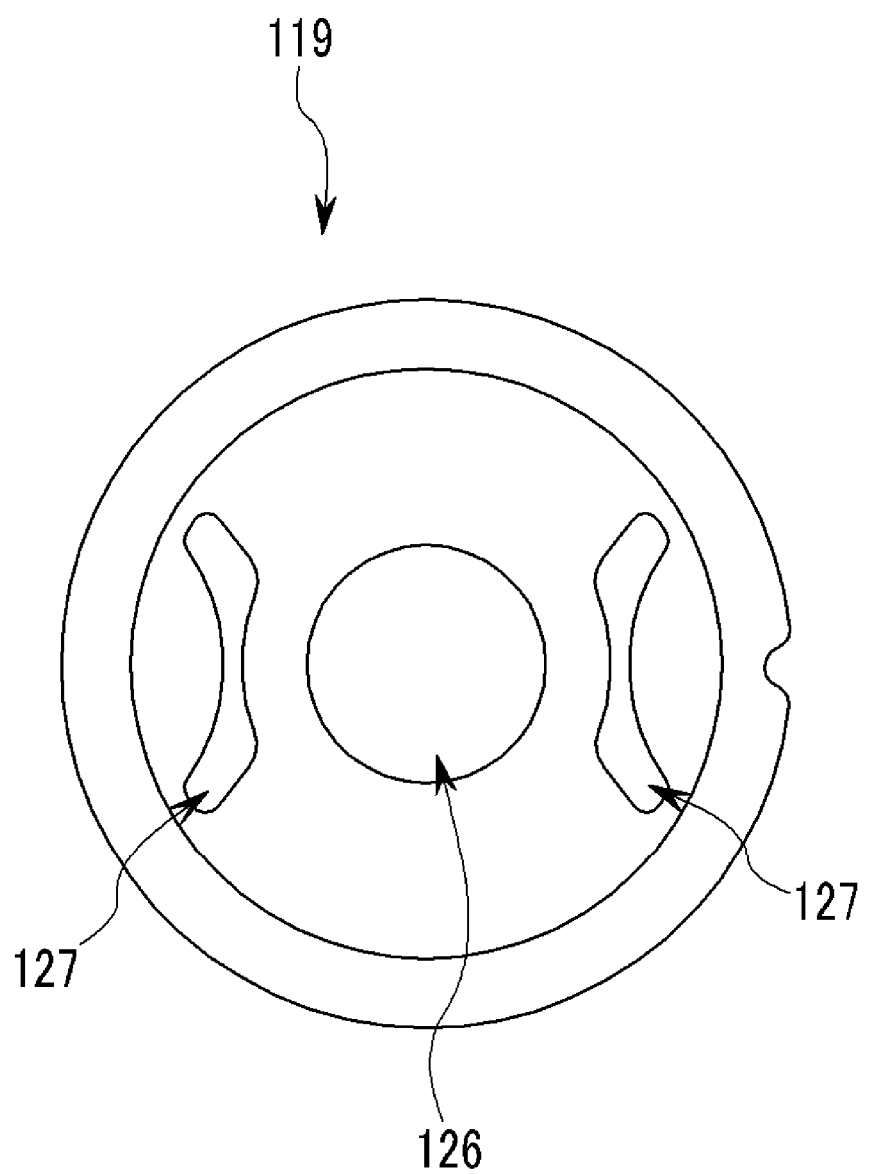
FIG. 16 is a front view of a general insulator for a bushing.

That is, as shown in FIG. 14, a torsion beam 101 that is disposed along a width direction of a vehicle, and a trailing arm 105 that is provided with a carrier 103 for mounting a tire and a wheel.

A bushing unit 109 and a shock absorber 107, which is connected with a frame of a vehicle, are disposed forward and rearward of the trailing arm 105, and a spring 113 is disposed to a spring seat 111.

The bushing unit 109 includes a bushing 121 and a bushing bracket 125.

The bushing 121 includes an outer pipe 115 that is connected to an end of the trailing arm 105, and an inner pipe 117 that is disposed within the outer pipe 115.

The bushing 121 is mounted to the bushing bracket 125, which is mounted to a subframe, by a bolt 123 that penetrates the inner pipe 117.

An insulator according to various embodiments of the present invention is disposed between the outer pipe 115 and the inner pipe 117.

Referring to FIG. 1 to FIG. 4, an insulator 1 according to various embodiments of the present invention includes a plurality of insulator bodies, and a center hole 3 into which the inner pipe is inserted is formed to each insulator body and a plurality of operation slots being symmetrically formed with respect to the center hole 3 are formed to each insulator body.

The insulator 1 includes first, second, and third insulator bodies 10, 20, and 30.

The operation slots are first, second, and third operation slots 11, 21, and 31, and they are respectively formed to the insulator bodies 10, 20, and 30.

The first, second, and third operation slots 11, 21, and 31 are symmetrically formed with respect to the center hole 3 as pairs, and ends of the operation slots 11, 21, and 31 are bent toward the circumference of the insulator 1. The operation slots 11, 21, and 31 are curved in the form of a crescent.

A distance between the second operation slot 21 and the center hole 3 is shorter than a distance between the first operation slot 11 and the center hole 3, and the second operation slot end 23 is formed between the first operation slot end 13 and an imaginary line 5 perpendicularly penetrating the center hole 3.

The third operation slot 31 has the same shape as the first operation slot 11, and is formed at the same position as the first operation slot 11.

In other embodiments of the present invention, the first, second and third operation slots 11, 21 and 31 may be formed at the different position each other in a radial direction from the center hole 13.

In various embodiments of the present invention, the first, second and third operation slots 11, 21 and 31 may be disposed in the same direction such that each point of the respective operation slots 11, 21, and 31 nearest to the center hole 3 is aligned in the same axis so as to absorb impact more effectively.

Hereinafter, operations of the insulator 1 for a bushing according to various embodiments of the present invention will be explained.

The first, second, and third insulator bodies 10, 20, and 30 respectively having the first, second, and third operation slots 11, 21, and 31 are sequentially connected to each other and then connected to the bushing 121.

When a vehicle is driving, each of the insulator bodies 10, 20, and 30 are subject to impact.

A crack can be generated to the operation slots 11, 21, and 31 of the insulator bodies 10, 20, and 30 near the exterior circumference of the insulator 1.

For example, the crack may be generated to the first operation slot 11 of the first insulator body 10.

The crack may expand along a length direction of the first insulator body 10, but the crack cannot be transferred to the second and third insulator bodies 20 and 30 because the second operation slot 21 is differently positioned from the first operation slot 11, and the first, second, and third insulator bodies 10, 20 and 30 are separately disposed as shown in FIG. 4.

That is, the crack is generated in the first insulator body 10 but is not transferred to the second and third insulator bodies 20 and 30 so that durability of the insulator 1 can be enhanced.

The insulator 1 for a bushing according to various embodiments of the present invention includes the first, second, and third insulator bodies 10, 20, and 30, which have discontinuous operation slots 11, 21, and 31, and thus the crack can be prevented from transferring to the whole insulator 1.

Enhancement of the durability of the insulator 1 may induce improvement in ride comfort, performance, and stability of a vehicle.

Figure 5:
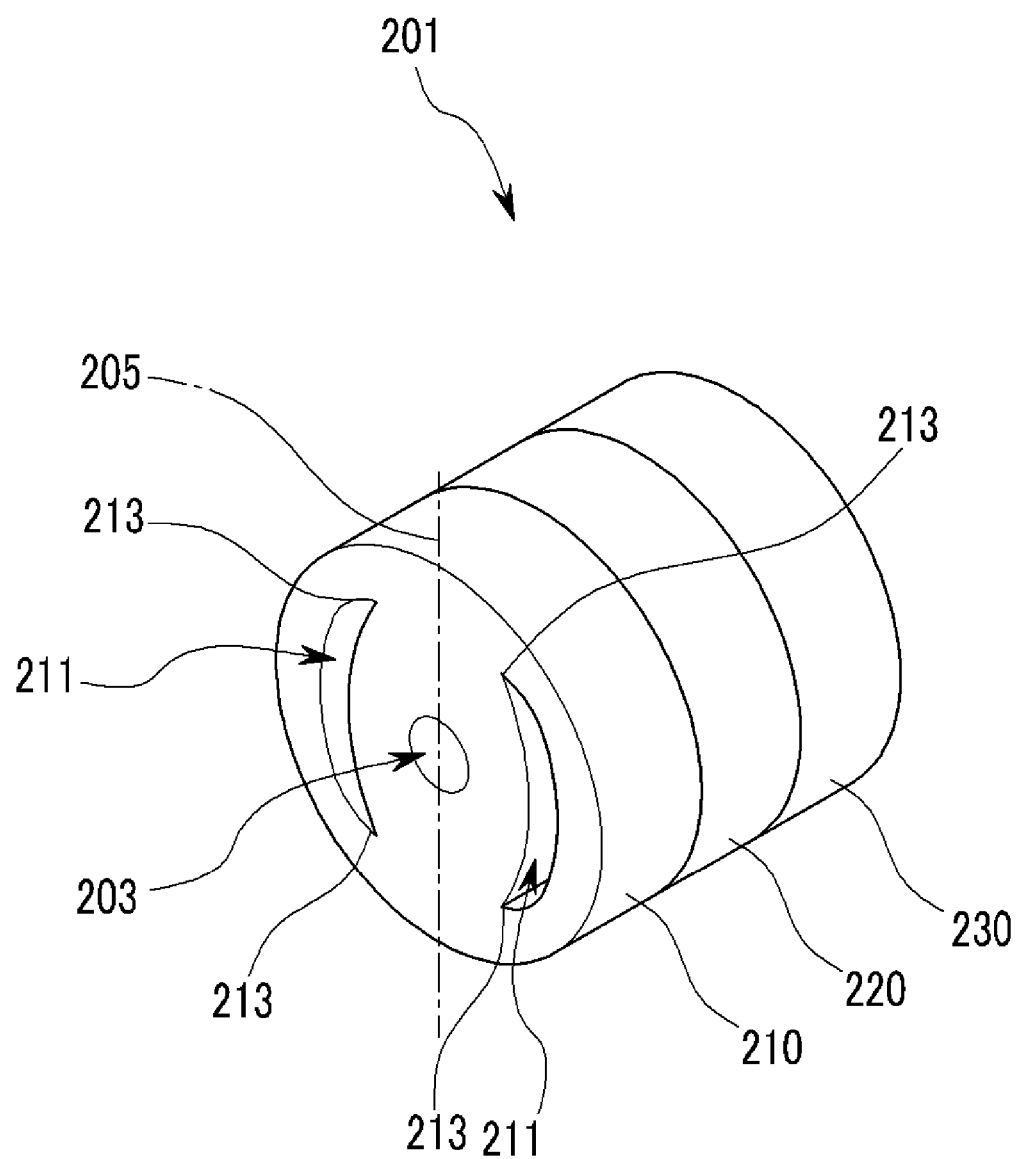
FIG. 5 is a perspective view of an insulator for a bushing according to a second exemplary embodiment of the present invention.
Figure 6:
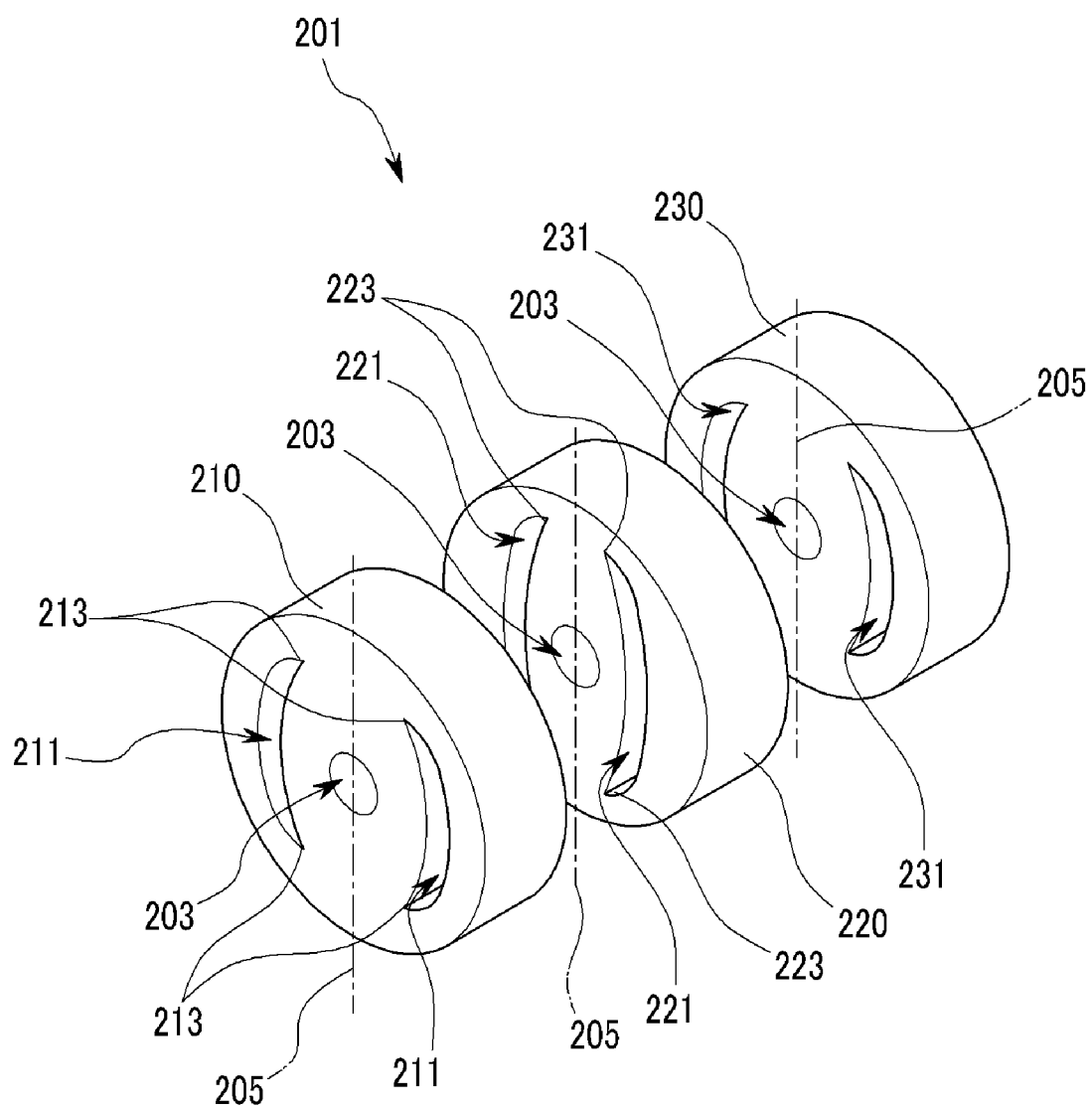
FIG. 6 is an exploded perspective view of an insulator for a bushing according to the second exemplary embodiment of the present invention.
Figure 7:
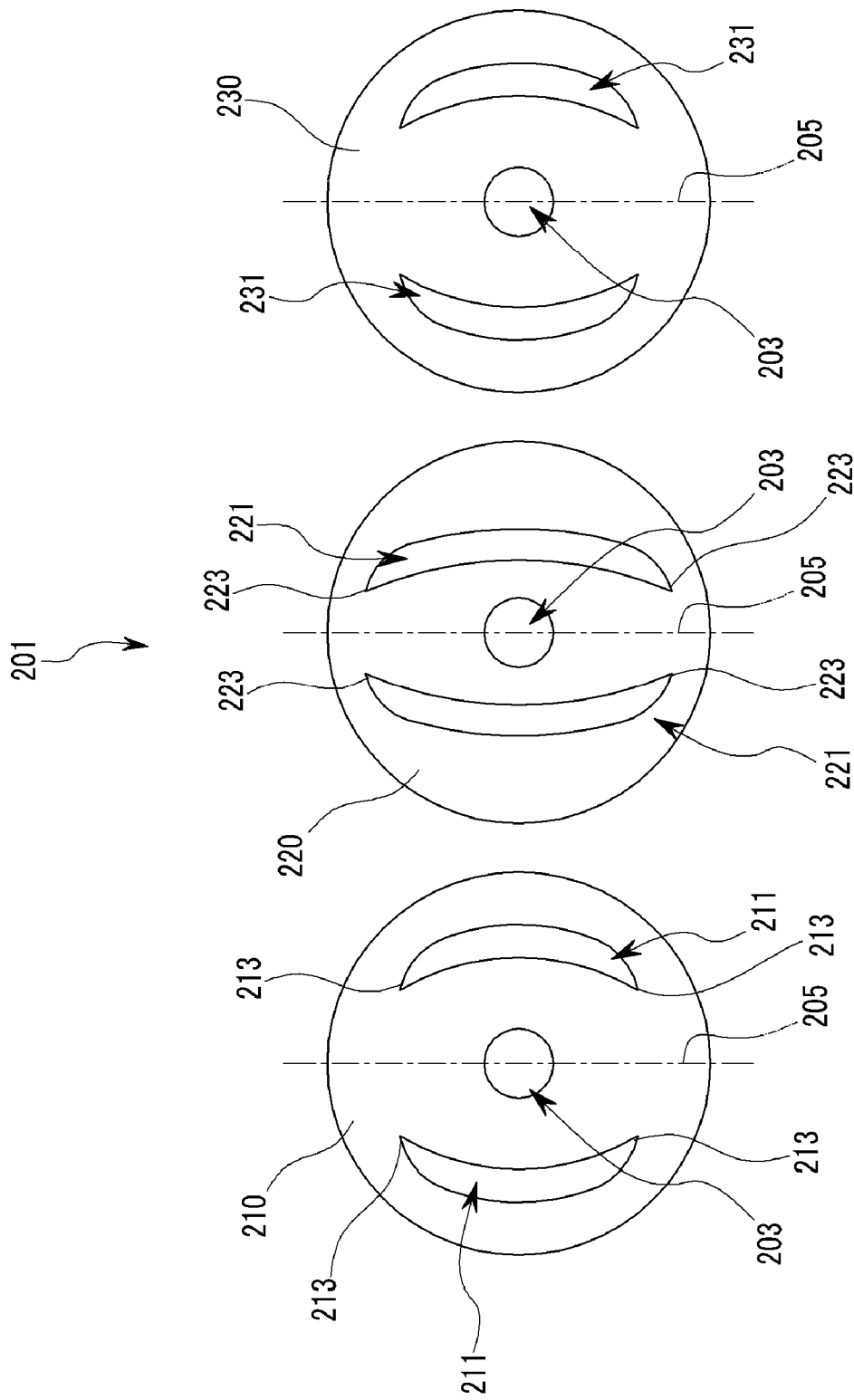
FIG. 7 is a front view of each insulator body of an insulator for a bushing according to the second exemplary embodiment of the present invention.

FIG. 5 and FIG. 6 are respectively a perspective view and an exploded perspective view of an insulator for a bushing according to other embodiments of the present invention. FIG. 7 is a front view of each insulator body of an insulator for a bushing according to other embodiments of the present invention.

Referring to the drawings, an insulator 201 according to other embodiments of the present invention includes a plurality of insulator bodies, and a center hole 203 into which the inner pipe is inserted is formed to each insulator body and a plurality of operation slots being symmetrically formed with respect to the center hole 203 are formed to each insulator body.

The insulator 201 includes first, second, and third insulator bodies 210, 220, and 230.

The operation slots are first, second, and third operation slots 211, 221, and 231 and they are respectively formed to the insulator bodies 210, 220, and 230.

The first, second, and third operation slots 211, 221, and 231 are symmetrically formed with respect to the center hole 203 as pairs, and ends of the operation slots 211, 221, and 231 are bent toward the inside of the insulator 201. The operation slots 211, 221, and 231 are curved in the form of a crescent.

A distance between the second operation slot 221 and the center hole 203 is shorter than a distance between the first operation slot 211 and the center hole 203, and the second operation slot end 223 is formed between the first operation slot end 213 and an imaginary line 205 perpendicularly penetrating the center hole 203.

The third operation slot 231 has the same shape of the first operation slot 211, and is formed at the same position as the first operation slot 211.

In various embodiments of the present invention, the first, second and third operation slots 211, 221 and 231 may be formed at the different position each other a radial direction from the center hole 203.

In various embodiments of the present invention, the first, second and third operation slots 211, 221 and 231 may be disposed in the same direction such that each point of the respective operation slots 211, 221, and 231 more far from the center hole 203 is aligned in the same axis so as to absorb impact more effectively.

Hereinafter, operations of the insulator 201 for a bushing according to other embodiments of the present invention will be explained.

The first, second, and third insulator bodies 210, 220, and 230 respectively having the first, second, and third operation slots 211, 221, and 231 are sequentially connected to each other and then connected to the bushing 121.

When a vehicle is driving, each of the insulator bodies 210, 220, and 230 are subject to impact.

A crack can be generated to the operation slots 211, 221, and 231 of the insulator bodies 210, 220, and 230 near the exterior circumference of the insulator 201.

For example, the crack may be generated to the first operation slot 211 of the first insulator body 210.

The crack may expand along a length direction of the first insulator body 210, but the crack cannot be transferred to the second and third insulator bodies 220 and 230 because the second operation slot 221 is differently positioned from the first operation slot 211, and the first, second, and third insulator bodies 210, 220 and 230 are separately disposed as shown in FIG. 7.

That is, the crack is generated in the first insulator body 210 but is not transferred to the second and third insulator bodies 220 and 230 so that durability of the insulator 201 can be enhanced.

The insulator 201 for a bushing according to other embodiments of the present invention includes the first, second, and third insulator bodies 210, 220, and 230, which have discontinuous operation slots 211, 221, and 231, and thus the crack can be prevented from transferring to the whole insulator 201.

Enhancement of the durability of the insulator 201 may induce improvement in ride comfort, performance, and stability of a vehicle.

Figure 8:
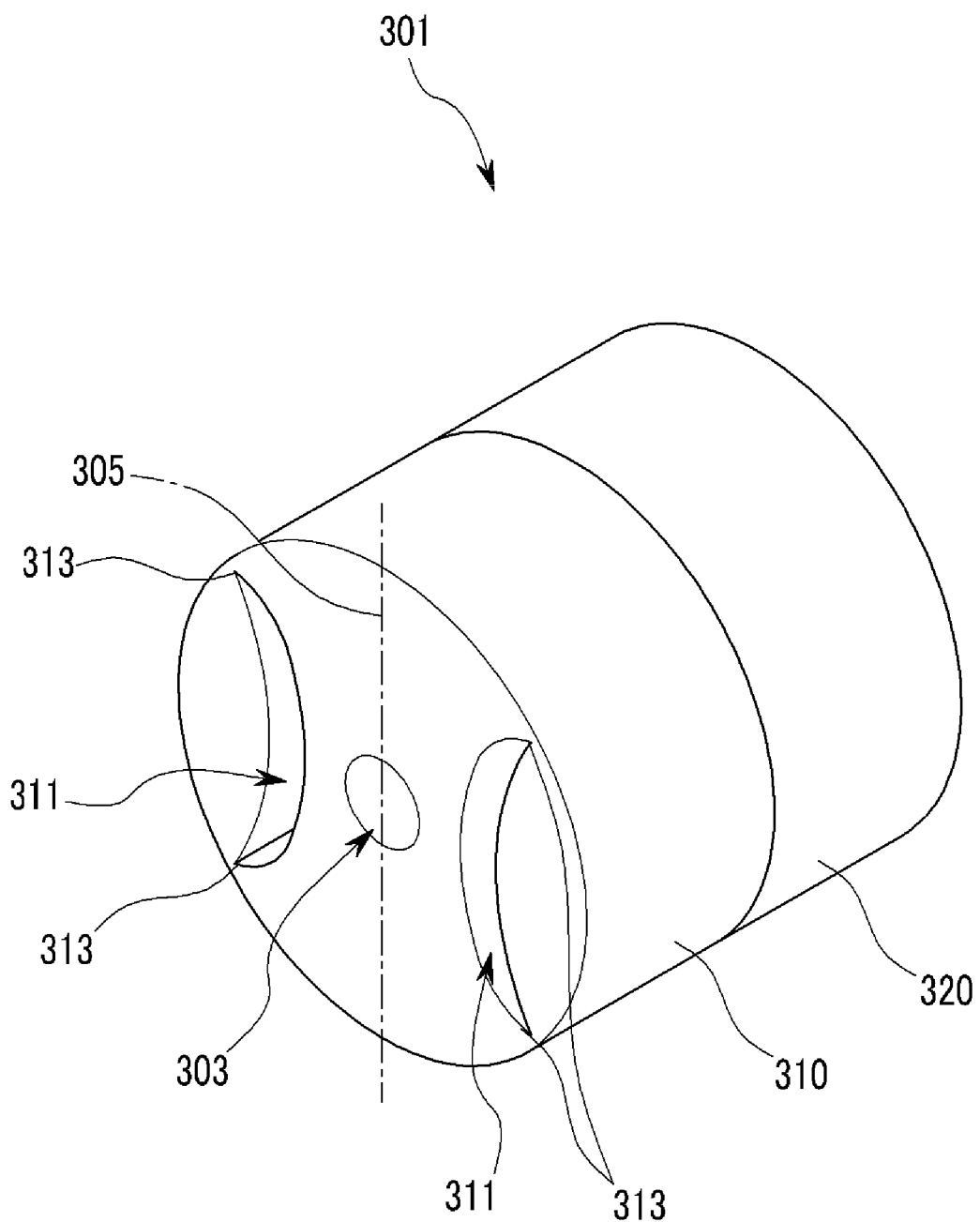
FIG. 8 is a perspective view of an insulator for a bushing according to a third exemplary embodiment of the present invention.
Figure 9:
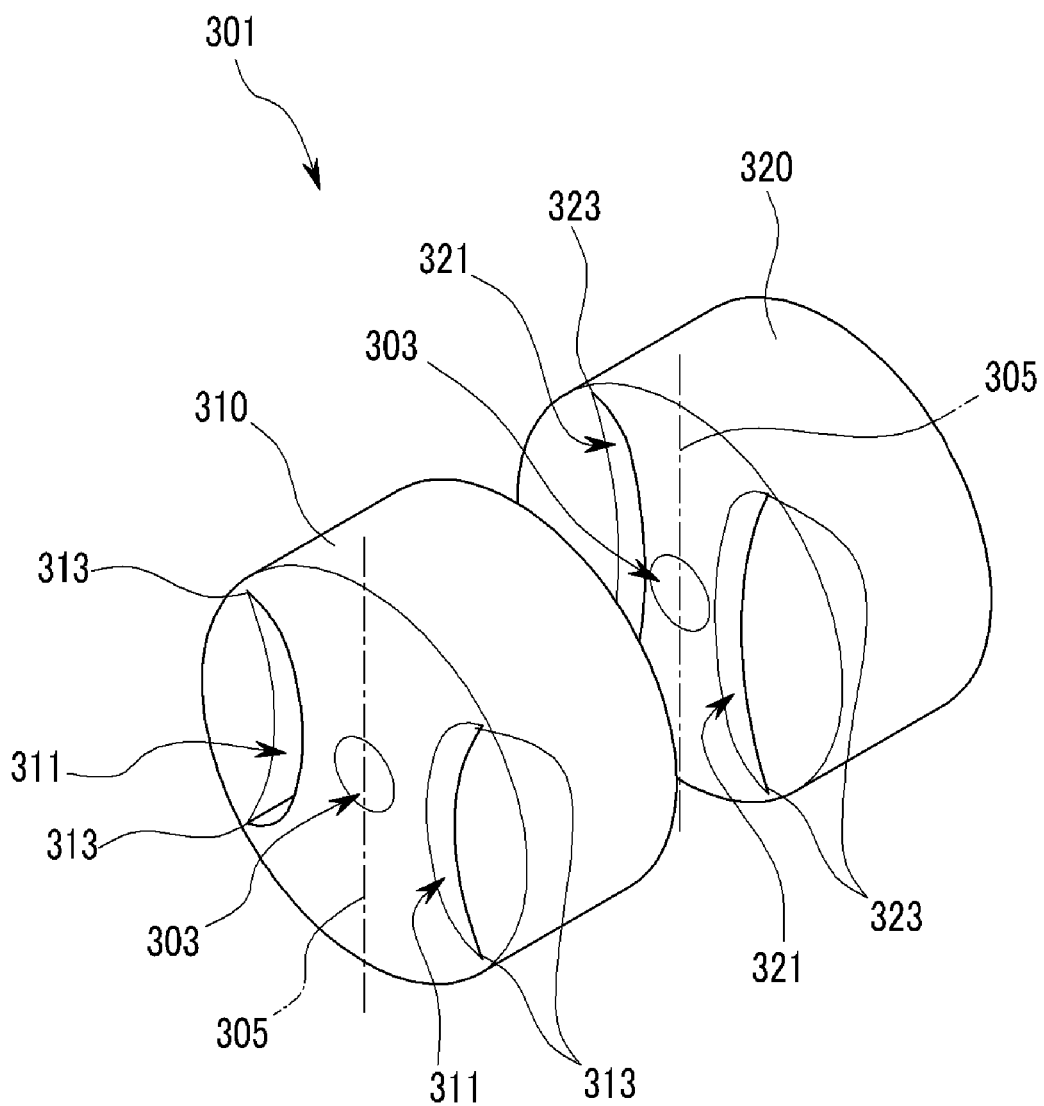
FIG. 9 is an exploded perspective view of an insulator for a bushing according to the third exemplary embodiment of the present invention.
Figure 10:
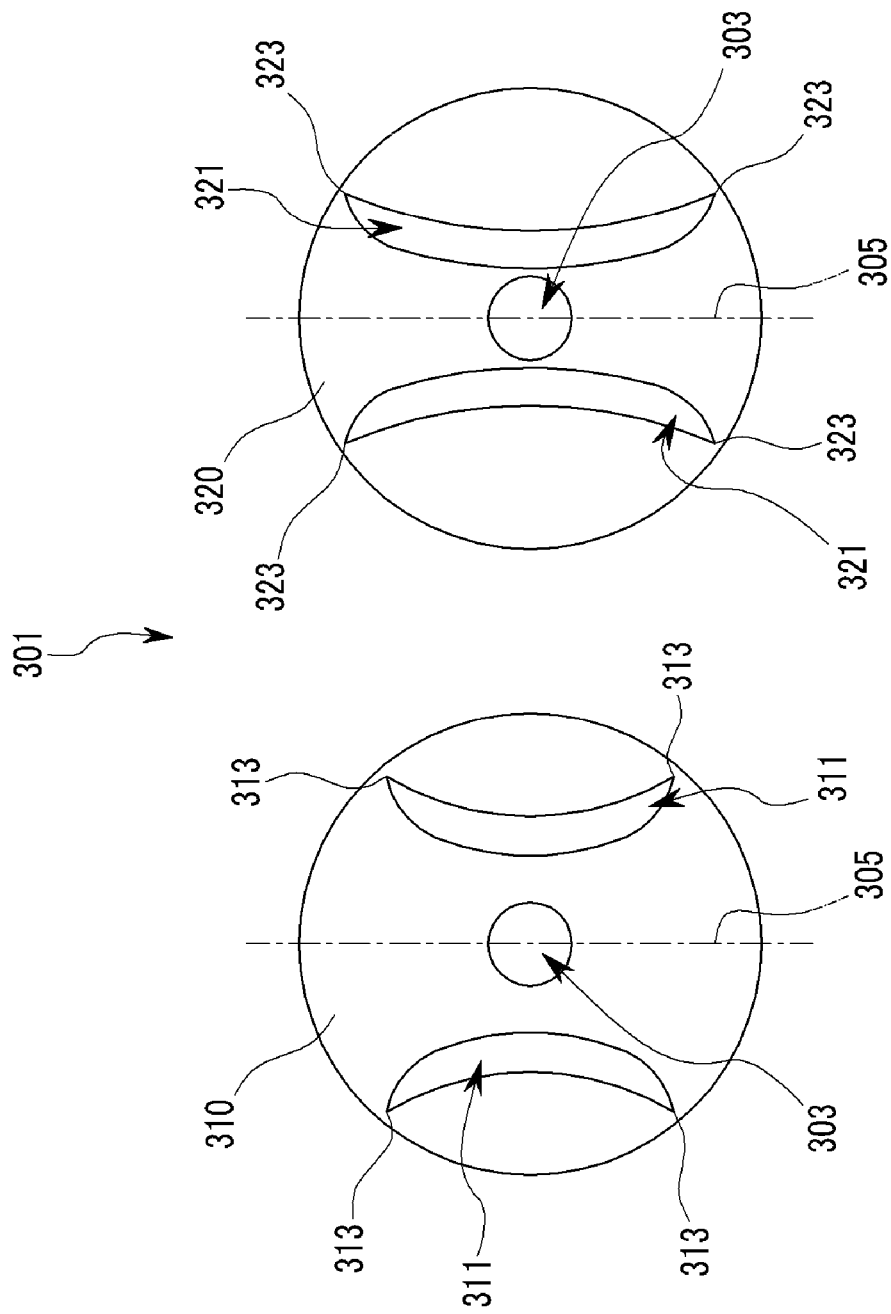
FIG. 10 is a front view of each insulator body of an insulator for a bushing according to the third exemplary embodiment of the present invention.

FIG. 8 and FIG. 9 is respectively a perspective view and an exploded perspective view of an insulator for a bushing according to other embodiments of the present invention, and FIG. 10 is a front view of each insulator body of an insulator for a bushing according to other embodiments of the present invention.

Referring to the drawings, an insulator 301 according to various embodiments of the present invention includes a plurality of insulator bodies, and a center hole 303 into which the inner pipe is inserted is formed to each insulator body and a plurality of operation slots being symmetrically formed with respect to the center hole 303 are formed to each insulator body.

The insulator 301 includes first and second insulator bodies 310 and 320.

The operation slots are first and second operation slots 311 and 321, and they are respectively formed to the insulator bodies 310 and 320.

The first and second operation slots 311 and 321 are symmetrically formed with respect to the center hole 303 as pairs, and ends of the operation slots 311 and 321 are bent toward the circumference of the insulator 301. The operation slots 311 and 321 are curved in the form of a crescent.

A distance between the second operation slot 321 and the center hole 303 is shorter than a distance between the first operation slot 311 and the center hole 303, and the second operation slot end 323 is formed between the first operation slot end 313 and an imaginary line 305 perpendicularly penetrating the center hole 303.

Hereinafter, operations of the insulator 301 for a bushing according to various embodiments of the present invention will be explained.

The first and second insulator bodies 310 and 320 respectively having the first and second operation slots 311 and 321 are connected to each other and then connected to the bushing 121.

When a vehicle is driving, each of the insulator bodies 310 and 320 are subject to impact.

A crack can be generated to the operation slot 311 and 321 of the insulator bodies 310 and 320 near the exterior circumference of the insulator 301. For example, the crack may be generated to the first operation slot 311 of the first insulator body 310.

The crack may expand along a length direction of the first insulator body 310, but the crack cannot be transferred to the second insulator body 320 because the second operation slot 321 is differently positioned from the first operation slot 311 and the first and second insulator bodies 310 and 320 are separately disposed, as shown in FIG. 10.

That is, the crack is generated in the first insulator body 310 but is not transferred to the second insulator body 320 so that durability of the insulator 301 can be enhanced.

The insulator 301 for a bushing according to various embodiments of the present invention includes the first and second insulators 310 and 320, which have discontinuous operation slots 311 and 321, and thus the crack can be prevented from transferring to the whole insulator 301.

Enhancement of the durability of the insulator 301 may induce improvement in ride comfort, performance, and stability of a vehicle.

Figure 11:
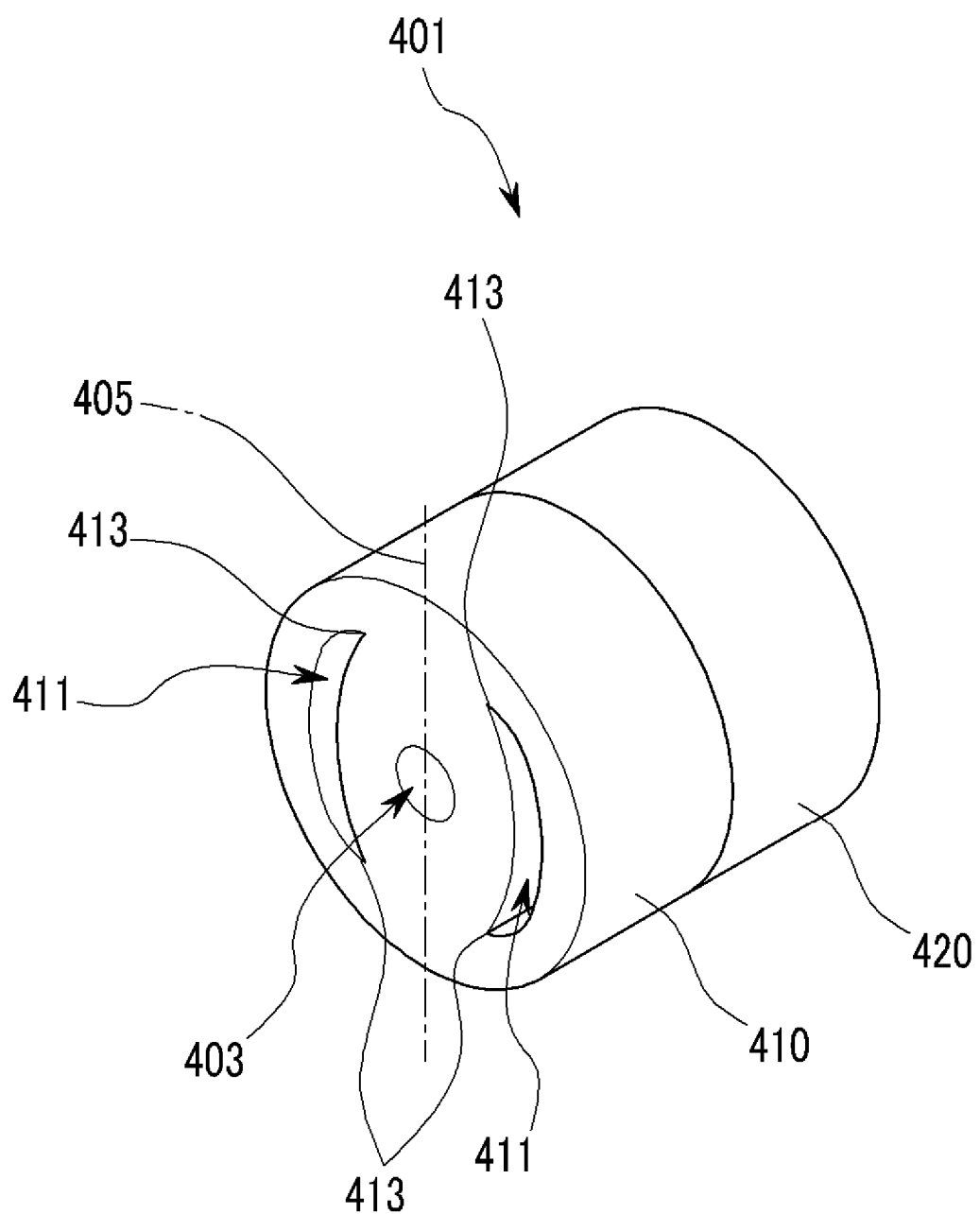
FIG. 11 is a perspective view of an insulator for a bushing according to a fourth exemplary embodiment of the present invention.
Figure 12:
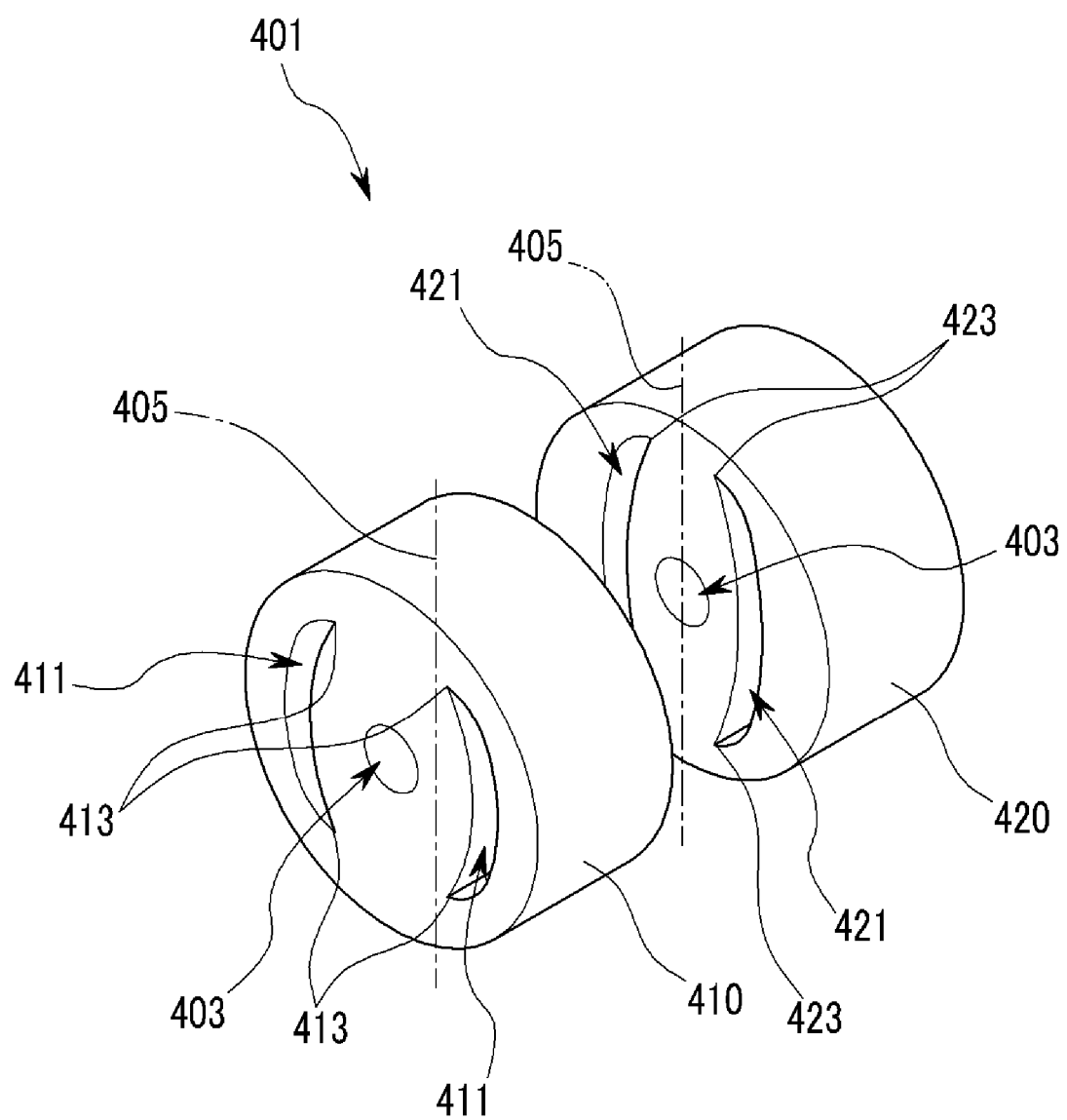
FIG. 12 is an exploded perspective view of an insulator for a bushing according to the fourth exemplary embodiment of the present invention.

FIG. 11 and FIG. 12 is respectively a perspective view and an exploded perspective view of an insulator for a bushing according to other embodiments of the present invention, and FIG. 10 is a front view of each insulator body of an insulator for a bushing according to various embodiments of the present invention.

Referring to the drawings, an insulator 401 according to various embodiments of the present invention includes a plurality of insulator bodies, and a center hole 403 into which the inner pipe is inserted is formed to each insulator body and a plurality of operation slots being symmetrically formed with respect to the center hole 403 are formed to each insulator body.

The insulator 401 includes first and second insulator bodies 410 and 420.

The operation slots are first and second operation slots 411 and 421, and they are respectively formed to the insulator bodies 410 and 420.

The first and second operation slots 411 and 421 are symmetrically formed with respect to the center hole 403 as pairs, and ends of the operations hole 411 and 421 are bent toward the circumference of the insulator 401. The operation slots 411 and 421 are curved in the form of a crescent.

A distance between the second operation slot 421 and the center hole 403 is shorter than a distance between the first operation slot 411 and the center hole 403, and the second operation slot end 423 is formed between the first operation slot end 413 and an imaginary line 405 perpendicularly penetrating the center hole 403.

Hereinafter, operations of the insulator 401 for a bushing according to various embodiments of the present invention will be explained.

The first and second insulator bodies 410 and 420 respectively having the first and second operation slots 411 and 421 are sequentially connected to each other and then connected to the bushing 121.

When a vehicle is driving, each of the insulator bodies 410 and 420 are subject to impact.

A crack can be generated to the operation slots 411 and 421 of the insulator bodies 410 and 420 near the exterior circumference of the insulator 401.

For example, the crack may be generated to the first operation slot 411 of the first insulator body 410.

Figure 13:
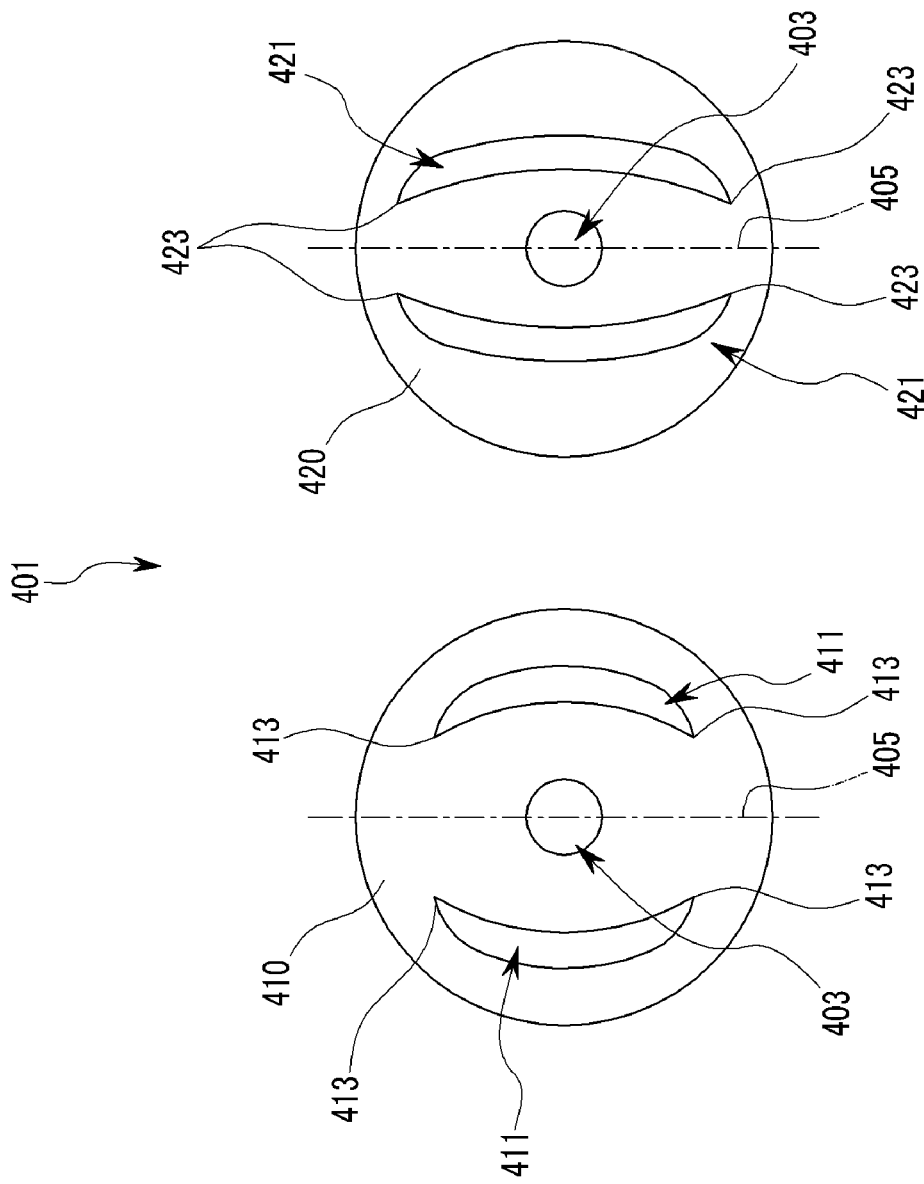
FIG. 13 is a front view of each insulator body of an insulator for a bushing according to the fourth exemplary embodiment of the present invention.

The crack expand along a length direction of the first insulator body 410, but the crack cannot be transferred to the second insulator body 420 because the second operation slot 421 is differently positioned from the first operation slot 411 and the first and second insulator bodies 410 and 420 are separately disposed, as shown in FIG. 13.

That is, the crack is generated in the first insulator body 410 but is not transferred to the second insulator body 420 so that durability of the insulator 401 can be enhanced.

The insulator 401 for a bushing according to various embodiments of the present invention includes the first and second insulators 410 and 420, which have discontinuous operation slots 411 and 421, and thus the crack can be prevented from transferring to the whole insulator 401.

Enhancement of the durability of the insulator 401 may induce improvement in ride comfort, performance, and stability of a vehicle.

The insulators 1, 201, 301 and 401 may be applied to bushings for mounting other element to a vehicle.

FIG. 17 is a perspective view showing an engine and a transmission, which is provided with an insulator according to various embodiments of the present invention.

As shown in FIG. 17, an engine mounting bushing 512, an engine mounting bushing bracket 514 and an engine mounting bolt 516 are disposed for mounting an engine 510 to a vehicle body 600.

The insulator 1, 201, 301 and 401 can be disposed to the engine mounting bushing 512 and vibration generated by the engine 510 can be prevented from being transmitted to the vehicle body 600 due to the insulator 1, 201, 301 and 401 also, the crack may not be transferred to the whole insulator 1, 201, 301 and 401 so that durability of the insulator 1, 201, 301 and 401 can be enhanced.

Also, a transmission mounting bushing 522, a transmission mounting bushing bracket 524 and a transmission mounting bolt 526 are disposed for mounting a transmission 520 to the vehicle body 600.

The insulator 1, 201, 301 and 401 can be disposed to the transmission mounting bushing 522 and vibration generated by the transmission 520 can be prevented from being transmitted to the vehicle body 600 due to the insulator 1, 201, 301 and 401 also, the crack may not be transferred to the whole insulator 1, 201, 301 and 401 so that durability of the insulator 1, 201, 301 and 401 can be enhanced.

In one aspect of the present invention, the directionality of the damping in the insulator can be controlled by rotating relatively each insulator body with the center hole.

For convenience in explanation and accurate definition in the appended claims, the terms "front", "rear", "inside", "forward" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An insulator for a bushing comprising:
    a plurality of insulator bodies;
    a center hole formed to each insulator body for coupling the insulator bodies of the bushing to a bushing bracket; and
    operation slot being formed on each insulator body;
    wherein the insulator bodies are separately coupled each other; and
    wherein each operation slot is configured to be offset from the center hole with a predetermined distance in a radial direction thereof and operation slots of at least two insulator bodies are not disposed on the same position in the radial direction from the center hole so as to prevent extensions of cracks occurring at the insulator bodies.

2. The insulator of claim 1, wherein when the number of operation slots is even number per one insulator body, the operation slots are disposed symmetrically with respect to the center hole.

3. The insulator of claim 1, wherein a relative rotation angle between each operation slot is substantially zero with respect to the center hole so that the bushing has one directionality of damping.

4. The insulator of claim 1, wherein distal end positions and center portion of the operation slot are configured not to be disposed on a common axis.

5. An insulator for a bushing comprising a plurality of insulator bodies, wherein a center hole is formed to each insulator body for inserting a bolt for connecting the bushing and a bushing bracket, and a plurality of operation slots being symmetrically formed with respect to the center hole are formed to each insulator body;
    wherein the insulator is a combination of first, second, and third insulator bodies, first, second, and third operation slots are respectively formed to the first, second, and third insulator bodies, each operation slot per one insulator body is symmetrically formed as a pair with respect to the center hole, and the shape of each operation slot is as a crescent and distal ends of the each operation slot are bent toward the circumference of the insulator; and
    wherein a distance between the second operation slot and the center hole is shorter than a distance between the first operation slot and the center hole, and distal ends of the second operation slot are formed between distal ends of the first operation slot and an imaginary line perpendicularly penetrating the center hole.

6. The insulator of claim 5, wherein the third operation slot has the same shape as the first operation slot and is formed at the same position as the first operation slot.

7. The insulator of claim 5, wherein the insulator is disposed in a trailing arm bushing, which is engaged with a bushing bracket of a sub-frame connected to an end of a coupled torsion beam axle type of suspension system.

8. The insulator of claim 5, wherein the insulator is disposed in an engine mounting bushing for mounting an engine.

9. The insulator of claim 5, wherein the insulator is disposed in a transmission mounting bushing for mounting a transmission.

10. An insulator for a bushing comprising a plurality of insulator bodies, wherein a center hole is formed to each insulator body for inserting a bolt for connecting the bushing and a bushing bracket, and a plurality of operation slots being symmetrically formed with respect to the center hole are formed to each insulator body;
    wherein the insulator is a combination of first, second, and third insulator bodies, first, second, and third operation slots are respectively formed to the first, second, and third insulator bodies, the operation slots are symmetrically formed as pairs per one insulator body with respect to the center hole, and the shape of the operation slots is as a crescent and distal ends of the operation slots are bent toward the inside of the insulator; and
    wherein a distance between the second operation slots and the center hole is shorter than a distance between the first operation slots and the center hole, and distal ends of the second operation slots are formed between distal ends of the first operation slot and an imaginary line perpendicularly penetrating the center hole.

11. The insulator of claim 10, wherein the third operation slots has the same shape as the first operation slots and is positioned at the same position as the first operation slots.

12. The insulator of claim 10, wherein the insulator is disposed in a trailing arm bushing, which is engaged with a bushing bracket of a sub-frame connected to an end of a coupled torsion beam axle type of suspension system.

13. The insulator of claim 10, wherein the insulator is disposed in an engine mounting bushing for mounting an engine.

14. The insulator of claim 10, wherein the insulator is disposed in a transmission mounting bushing for mounting a transmission.

15. An insulator for a bushing comprising a plurality of insulator bodies, wherein a center hole is formed to each insulator body for inserting a bolt for connecting the bushing and a bushing bracket, and a plurality of operation slots being symmetrically formed with respect to the center hole are formed to each insulator body; and wherein the insulator is a combination of first and second insulator bodies, the plurality of operation slots are first and second operation slots that are respectively formed to the first and second insulator bodies, the operation slots are symmetrically formed as pairs per one insulator body with respect to the center hole, and the shape of the operation slots is as a crescent and ends of the operation slots are bent toward the circumference of the insulator; and wherein a distance between the second operation slot and the center hole is shorter than a distance between the first operation slot and the center hole, and distal ends of the second operation slot are formed between distal ends of the first operation slot and an imaginary line perpendicularly penetrating the center hole.

16. The insulator of claim 15, wherein the insulator is disposed in a trailing arm bushing, which is engaged with a bushing bracket of a sub-frame connected to an end of a coupled torsion beam axle type of suspension system.

17. The insulator of claim 15, wherein the insulator is disposed in an engine mounting bushing for mounting an engine.

18. The insulator of claim 15, wherein the insulator is disposed in a transmission mounting bushing for mounting a transmission.

19. An insulator for a bushing comprising a plurality of insulator bodies, wherein a center hole is formed to each insulator body for inserting a bolt for connecting the bushing and a bushing bracket, and a plurality of operation slots being symmetrically formed with respect to the center hole are formed to each insulator body;

wherein the insulator is a combination of first and second insulator bodies, first and second operation slots are respectively formed to the first and second insulator bodies, the operation slots are symmetrically formed as pairs per one insulator body with respect to the center hole, and the shape of the operation slots is as a crescent and ends of the operation slots are bent toward the inside of the insulator; and wherein a distance between the second operation slot and the center hole is shorter than a distance between the first operation slot and the center hole, and distal ends of the second operation slot are formed between distal ends of the first operation slot and an imaginary line perpendicularly penetrating the center hole.

20. The insulator of claim 19, wherein the insulator is disposed in a trailing arm bushing, which is engaged with a bushing bracket of a sub-frame connected to an end of a coupled torsion beam axle type of suspension system.

21. The insulator of claim 19, wherein the insulator is disposed in an engine mounting bushing for mounting an engine.

22. The insulator of claim 19, wherein the insulator is disposed in a transmission mounting bushing for mounting a transmission.

* * * * *